United States Patent [19]

Belt et al.

[11] Patent Number: 4,553,260
[45] Date of Patent: Nov. 12, 1985

[54] MEANS AND METHOD OF PROCESSING OPTICAL IMAGE EDGE DATA

[75] Inventors: Ronald A. Belt, Plymouth; James D. Joseph, Oakdale, both of Minn.

[73] Assignee: Honeywell Inc., Minneapolis, Minn.

[21] Appl. No.: 476,743

[22] Filed: Mar. 18, 1983

[51] Int. Cl.$^4$ .............................................. G06K 9/46
[52] U.S. Cl. ...................................... 382/22; 364/752; 382/41
[58] Field of Search .................. 382/21, 22, 41, 49; 358/96, 166; 364/725, 737, 715, 718, 721, 729-730, 737, 752, 813

[56] References Cited

U.S. PATENT DOCUMENTS

| | | | |
|---|---|---|---|
| 3,631,230 | 12/1971 | Chen | 364/752 |
| 3,789,203 | 1/1974 | Catherall et al. | 364/752 |
| 3,829,671 | 8/1974 | Gathright et al. | 364/752 |
| 3,858,036 | 12/1974 | Lunsford | 364/752 |
| 4,433,438 | 2/1984 | Couturier | 382/22 |

OTHER PUBLICATIONS

I. E. Abdou, et al., "Fast Nearest-Neighbor 2-Dimensional Interpolation Method for Imaging Devices of Dissimilar Resolution", IBM Technical Disclosure Bulletin, vol. 22, No. 4, Sep. 1979.
I. E. Abdou, et al., "Quantitative Design and Evaluation of Enhancement Thresholding Edge Detectors", USC Semiannual Technical Report, vol. 840, pp. 28-46, Sep. 1978.
R. A. Duda, et al., Pattern Classification and Scene Analysis, Wiley, New York, 1973.

Primary Examiner—Leo H. Boudreau
Attorney, Agent, or Firm—William T. Udseth

[57] ABSTRACT

Means and methods are provided for processing the quantity Si which corresponds to a point i in space where $Si=(Xi^2+Yi^2)^{\frac{1}{2}}$ and Xi and Yi are quantities lying along mutually orthogonal axes in the space. Si is approximated by the expression $A|Xi|+B|Yi|$ where A and B are constant coefficients selected to minimize the error in value of Si according to a selected error computation. A and B can be approximated as a binary power series with each series including a preselected number of terms. Another embodiment does not require means for approximating A and B as binary power series, but segments the coordinate space into m sectors and computes and Am and Bm for each of said m sectors. A particularly advantageous application of the invention is its use in a device and method for processing edge data concerning an edge in an optical image where Si is the Sobel, Prewitt or Roberts square root edge operators.

11 Claims, 8 Drawing Figures

FIG. 6  PERFORMANCE USING MULTISEGMENTED LINEAR APPROXIMATION
TECHNIQUE FOR VARIOUS (A,B) COMPUTATIONAL ERRORS IN PERCENT

| ANGLE (°) | (1,1/32) | (1,1/8) | (1,5/32) | (7/8,1/2) | ANGLE (°) | (7/8,1/2) | (7/8,33/64) | (7/8,17/32) |
|---|---|---|---|---|---|---|---|---|
| 0 | 0.0 | 0.0 | | | 22.5 | 0.0 | | |
| 1 | 0.0 | 0.2 | | | 23 | 0.1 | | |
| 2 | 0.0 | 0.4 | | | 24 | 0.3 | | |
| 3 | 0.0 | 0.5 | | | 25 | 0.4 | | |
| 4 | 0.0 | 0.6 | | | 26 | 0.6 | | |
| 5 | -0.1 | 0.7 | | | 27 | 0.7 | | |
| 6 | -0.2 | 0.8 | | | 28 | 0.7 | | |
| 7 | -0.4 | 0.8 | | | 29 | 0.8 | | |
| 8 | -0.5 | 0.8 | | | 30 | 0.8 | | |
| 9 | -0.7 | 0.7 | | | 31 | 0.8 | | |
| 10 | -1.0 | 0.7 | | | 32 | 0.7 | | |
| 11 | | 0.5 | | | 33 | 0.6 | | |
| 12 | | 0.4 | | | 34 | 0.5 | | |
| 13 | | 0.2 | 1.0 | | 35 | 0.4 | | |
| 14 | | 0.1 | 0.8 | | 36 | 0.2 | 1.1 | |
| 15 | | -0.2 | 0.6 | | 37 | 0.0 | 0.9 | |
| 16 | | -0.4 | 0.4 | | 38 | -0.3 | 0.7 | |
| 17 | | -0.7 | 0.2 | | 39 | | 0.4 | 1.4 |
| 18 | | -1.0 | -0.1 | | 40 | | 0.2 | 1.2 |
| 19 | | -1.4 | -0.4 | -1.0 | 41 | | -0.1 | 0.9 |
| 20 | | -1.8 | -0.7 | -0.7 | 42 | | -0.5 | 0.6 |
| 21 | | | -1.0 | -0.4 | 43 | | | 0.2 |
| 22 | | | -1.4 | -0.1 | 44 | | | -0.2 |
| 22.5 | | | | 0.0 | 45 | | | -0.6 |

MEANS AND METHOD OF PROCESSING OPTICAL IMAGE EDGE DATA

BACKGROUND OF THE INVENTION

1. Field of the Invention

This invention relates to means and methods of processing optical image edge data by approximating a quadratic function by a linear function and by approximating coefficients in the linear function.

2. Prior Art

Figure 1:
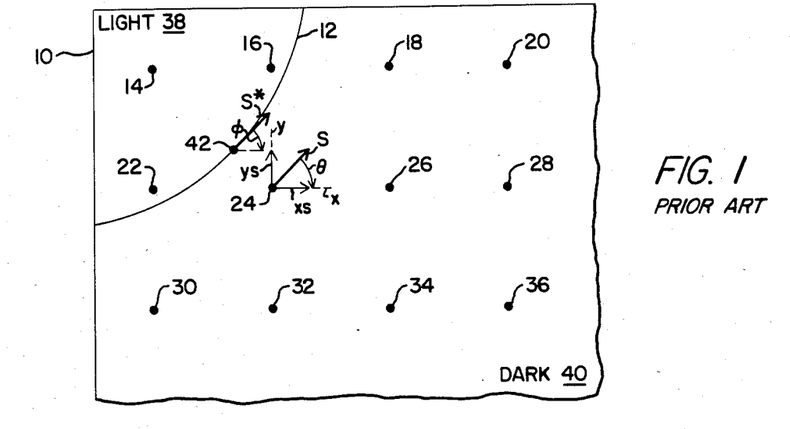
FIG. 1 is a partial schematic of an image display screen including twelve pixels with S, Xs and Ys illustrated for one pixel.

FIG. 1 shows a partial schematic of imaging screen 10 with an actual image edge line 12 superimposed thereupon. Twelve pixels numbered 14 through 36 are shown on screen 10 in FIG. 1. For illustrative purposes, the area 38 to the upper left of line 12, which includes pixels 14, 16 and 22, is chosen to be a light area and the area 40 to the lower right of line 12 including the remainder of the twelve pixels is chosen to be a dark area. Other pixels (not shown) would cover the remainder of screen 10 to complete an orthogonal grid pattern.

The pixels in light area 38 could all be of a first uniform intensity or could have varying intensities as could the pixels included in the dark area 40, but all pixels in light area 38 will have a higher intensity than any pixel in dark area 40. TV screens generally display data in analog form, however data extracted from the light intensities of pixels on the screen such as screen 10 are generally converted to digital signals for image processing purposes.

A well known method of processing pixel intensity data to determine the location of edge line 12 or to enhance images is to employ the Sobel square root magnitude expression given by:

$$S_i = (X_{Si}^2 + Y_{Si}^2)^{\frac{1}{2}} \quad (1)$$

where $S_i$ is the magnitude of the Sobel square root edge operator for a point i, $X_{si}$ is the horizontal edge component of S along the x-axis for point i and $Y_{si}$ is the vertical edge component of S along the y-axis for point i where the x and y axes are mutually orthogonal.

$X_s$ and $Y_s$ are determined for each pixel (i.e., for each point i) on screen 10 by spatially processing the discrete image array $F(j,k)$ of nine pixels centered about the pixel of interest, where j and k designate array elements. For example, the discrete image array for pixel 24 includes pixels 14, 16, 18, 22, 24, 26, 30, 32 and 34. For edge pixels such as pixel 14, the nine elements for the discrete array would include pixels 14, 16, 22 and 24 and various values would be assumed for pixels which would be located off screen.

For each pixel two gradient functions $X_s = G1(j,k)$ and $Y_s = G2(j,k)$ are generated by:

$$G_{1,2}(j,k) = F(j,k) \times H_{1,2}(j,k) \quad (2)$$

where X denotes two dimensional spatial convolution and H1 and H2 are linear operators given by $$H_1 = \begin{bmatrix} 1 & 0 & -1 \\ 2 & 0 & -2 \\ 1 & 0 & -1 \end{bmatrix} \text{ and} \quad (3)$$

$$H_2 = \begin{bmatrix} 1 & 0 & -1 \\ 2 & 0 & 0 \\ -1 & -2 & -1 \end{bmatrix}. \quad (4)$$

From FIG. 1 it can be seen that for pixel 24 (the ith point in this example) orthogonal components $X_{si}$ and $Y_{si}$ of the Sobel square root edge operator define the direction and magnitude of S. Equation 1 generates the magnitude of S and the orientation of S (see $\theta$ in FIG. 1) is given by:

$$\theta_i(j,k) = \tan^{-1}\left[\frac{Y_{Si}}{X_{Si}}\right]. \quad (5)$$

Equations 1 and 5 will yield only approximations of the edge magnitude and orientation of edge 12. The true magnitude of S at point 42 is illustrated as S* in FIG. 1 and the true orientation of S* is given by $\phi$ in FIG. 1.

Figure 2:
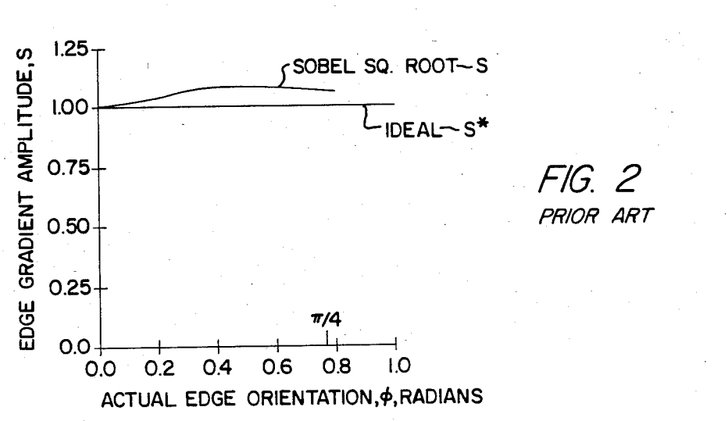
FIG. 2 displays the Sobel square root edge gradient amplitude as a function of actual edge orientation.

FIG. 2 illustrates edge gradient amplitude response as a function of actual edge orientation for the Sobel operator. Note that the Sobel square root amplitude response is relatively invariant to actual orientation but is consistently high over much of the 0 to $\pi/4$ range by about 10%.

Figure 3:
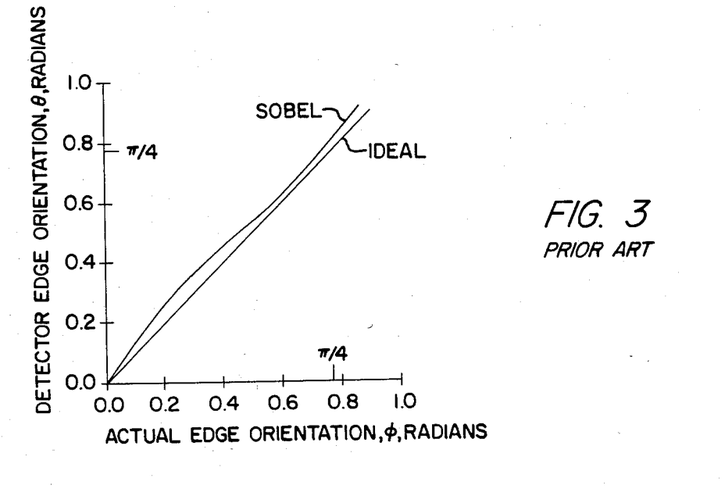
FIG. 3 displays the detected edge orientation using the Sobel operator in comparison to the actual orientation.

FIG. 3 indicates that the Sobel operator provides very linear response between the actual and the detected edge orientation.

Two other common square root edge operators are the Prewitt and Roberts square root operators. Equations 1 and 2 are valid for these operators as well, however matrixes $H_1$ and $H_2$ are different for each operator.

Further discussions of the Sobel operator and other spatial edge enhancement operators are found in I. E. Abdou and W. K. Pratt "Quantitative Design and Evaluation of Enhancement/Thresholding Edge Detectors", *U.S.C. Semiannual Technical Report*, Vol. 840, pages 28 to 46, September, 1978, and R. A. Duda and P. E. Hart, *Pattern Classification and Scene Analysis*, Wiley, N.Y., 1973, the same being incorporated herein by reference.

S could be calculated from equation 1 by using a look-up table approach wherein various values of Xs and Ys as well as the square root of the sum of these squared quantities would be available for the range of possible Xs and Ys. Such information could, for example, be held in a semiconductor ROM. However, implementation of such an approach with a ROM requires random logic to implement adders necessary for generating the sum in equation 1 which in turn necessitates custom semiconductor chip development. Further, as larger bit input data is used to increase or insure the accuracy of S, the size of the ROM is substantially increased. Also, the method of the present invention can be implemented on a single commercial gate array chip with virtually no memory or memory control requirements.

Techniques where S could be accurately approximated while substantially avoiding the look-up approach would facilitate processing of edge data by both substantially increasing speed (by avoiding memory access) and reducing hardware requirements.

SUMMARY OF THE INVENTION

Means and methods are provided for processing the quantity Si which corresponds to a point i in space where $Si=(Xi^2+Yi^2)^{1/2}$ and Xi and Yi are quantities lying along mutually orthogonal axes in the space. Si is approximated by the expression $A|Xi|+B|Yi|$ where A and B are constant coefficients selected to minimize the error in the value of Si according to a selected error computation. A and B can be approximated as binary power series with each series including a preselected number of terms. Another embodiment does not require means for approximating A and B as binary power series, but segments the coordinate space into m sectors and computes and Am and Bm for each of said m sectors. A particularly advantageous application of the invention is its use in a device and method for processing edge data concerning an edge in an optical image where Si is the Sobel, Prewitt or Roberts square root edge operators.

DESCRIPTION OF THE PREFERRED EMBODIMENT

S can be approximated by a linear function, i.e.:
$$S \sim AU+BV \quad (6)$$

where A and B are constants to be determined, and $$U = \begin{cases} |X_S| & \text{if } |X_S| \geq |Y_S| \\ |Y_S| & \text{if } |X_S| < |Y_S| \end{cases}$$

$$V = \begin{cases} |Y_S| & \text{if } |X_S| \geq |Y_S| \\ |X_S| & \text{if } |X_S| < |Y_S| \end{cases}$$

In polar coordinates equation 6 is:

$$S \sim Ar\cos\theta + Br\sin\theta \quad (7)$$

Initially the error in equation 7 due to its being an approximation will be analyzed for the first quadrant, i.e. $\theta=0$ to $\theta=\pi/4$.

The normalized error $\epsilon(r,\theta)$ from equation 7 is:

$$\epsilon(r,\theta) = \frac{Ar\cos\theta + Br\sin\theta - r}{r} = A\cos\theta + B\sin\theta - 1. \quad (8)$$

The total squared normalized error in the first half quadrant from $r=0$ to $r=R$ is given by:

$$E^2(A,B) = \int_0^{\pi/4} \int_0^R [A\cos\theta + B\sin\theta - 1]^2 r \, dr \, d\theta \quad (9)$$

$$= \frac{R^4}{4} \int_0^{\pi/4} [A\cos\theta + B\sin\theta - 1]^2 d\theta.$$

Integrating we have:

$$E^2(A,B) = \quad (10)$$

$$\frac{R^4}{4} [0.6427A^2 0.1427B^2 + 0.5AB - 1.4142A - 0.5858B].$$

To minimize $E^2$ (i.e., to minimize the mean squared error) one differentiates with respect to A and B and sets both partial derivatives equal to 0. This results in the following two equations in two unknowns:

$$\frac{\partial E^2}{\partial A} = 0 = 1.2854A + 0.5B - 1.4142 \quad (11)$$

$$\frac{\partial E^2}{\partial B} = 0 = 0.2854B + 0.5A - 0.5858 \quad (12)$$

Solving for
A and B we obtain:
A=0.9474 and
B=0.3928.

The maximum error is found by setting the differential of the normalized error with respect to $\theta$ equal to 0, i.e.

$$\frac{\partial \epsilon}{\partial \theta} = \frac{\partial}{\partial \theta}\left(\frac{Ar\cos\theta + Br\sin\theta - r}{r}\right) = 0. \quad (13)$$

Also note that:

$$\tan\theta = \frac{B}{A}. \quad (14)$$

Solving for $\theta$ from equation 14 using the values for A and B above, and substituting the result into equation 13, yields:

$\epsilon_{max}=5.3\%$.

Equations 13 and 14 demonstrate that the maximum error is independent of r. This means that the method of the present invention can be extended to the same precision with larger word size merely by increasing the accuracy of the adders and multipliers used to process the words.

Using the above approximation of the Sobel magnitude requires the multiplication of U and V by A and B, respectively. As will be discussed further below, one could simplify the hardware considerably by changing A and B slightly so that the products AU and BV can be computed by simple shifting operations and the additions and substractions of binary numbers. For example, the values of A and B above could be approximated as follows:

Set $A=0.9375=1-1/16$ and $B=0.375=\frac{1}{4}+\frac{1}{8}$.

The maximum error using this approximation of binary numbers is increased to 7.2%. However, the maximum error can be further reduced by approximating the Sobel magnitude function with two or more linear combinations of A and B over the range $\theta=0$ to $\theta=\pi/4$; i.e., $$S \sim A_1 U + B_1 V \quad 0 \leq \theta \leq \theta_1 \quad (15)$$
$$S \sim A_2 U + B_2 V \quad \theta_1 \leq \theta \leq \theta_2$$
$$\vdots$$
$$S \sim A_m U + B_m V \quad \theta_{m-1} \leq \theta \leq \pi/4.$$

We can then compute values Am and Bm for each of the m angular segments using exactly the same procedure described above for the entire first half quadrant. The sizes of the segments may not be equal, although it is advantageous for one boundary to be at $\pi/8$.

Whether a segmented approach is used or not, the binary representation of Am and Bm can be summarized as follows:

$$A_m = \sum_{l=0}^{N} \frac{c_l}{2^l} \quad (16)$$

$$B_m = \sum_{l=1}^{P} \frac{d_l}{2^l} \quad (17)$$

where N and P are positive integers while $c_l$ and $d_l$ are integers which can assume only the values of $-1, 0$ or $+1$. It is preferred that $N \leq 2$ and $P \leq 3$, so that the series represented by equations 16 and 17 have no more than three terms in each. This will insure an advantage in implementing the method of the present invention where Am and Bm are binary power series. As is discussed further below, representation of Am and Bm as per equations 16 and 17 allows one to avoid multipliers in the hardware and instead use adders. If multipliers are used, increased bit precision is achieved only at the cost of additional stages and thus gate delay increases. The gate delay if only adders are employed will, on the other hand, remain roughly constant.

Figure 4:
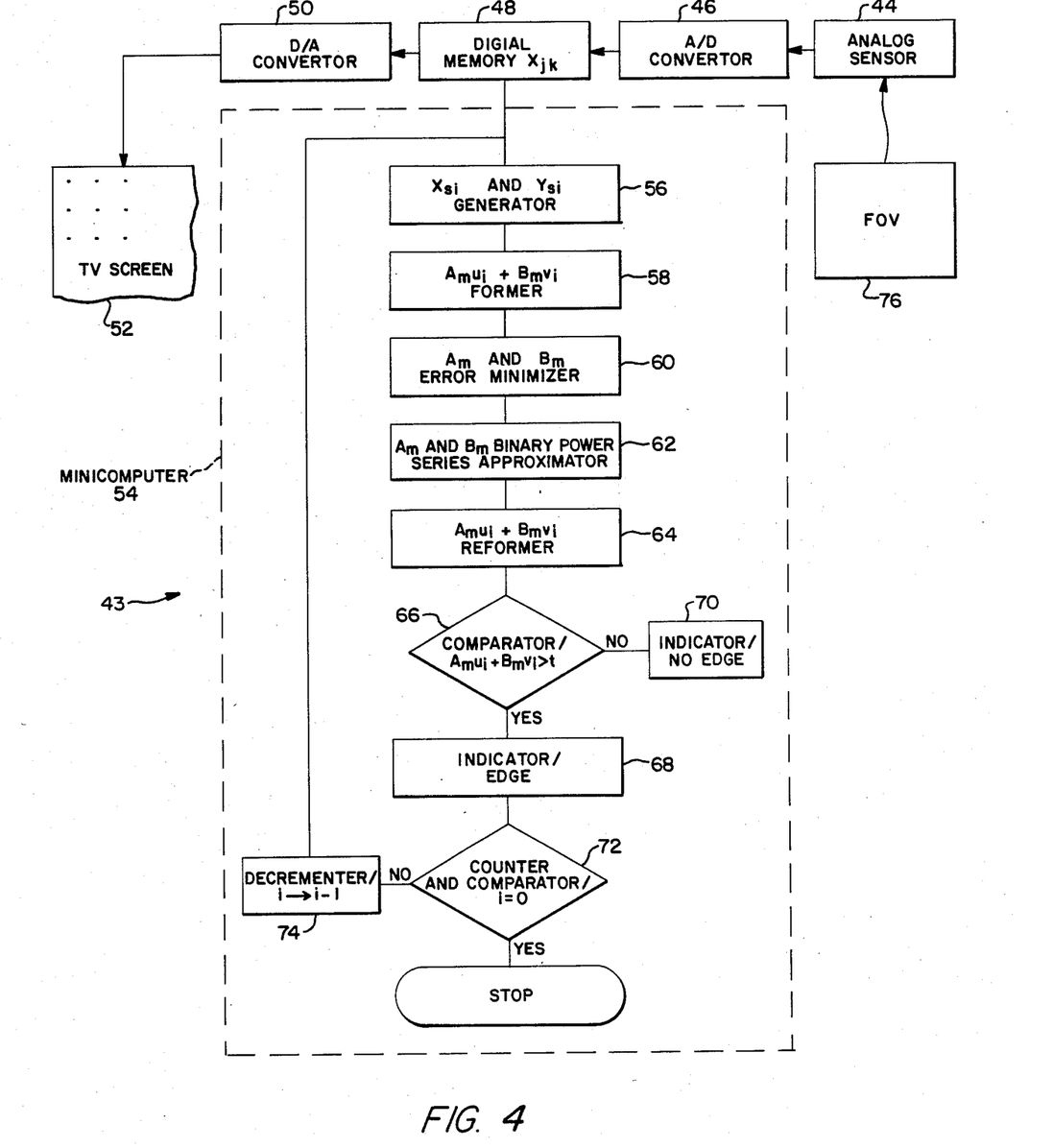
FIG. 4 is a schematic of a device for processing edge data in accordance with one embodiment of the present invention.

Referring to FIG. 4, a schematic of device 43 is shown. Device 43 includes analog sensor 44, analog to digital converter 46, digital memory 48, digital to analog converter 50, television screen 52 and minicomputer 54 within the dashed line. Minicomputer 54 includes means 56 to generate Xsi and Ysi, means 58 to form the linear expression AmUi+BmVi (where Am and Bm are yet to be determined), means 60 to generate the minimum values of Am and Bm to minimize error over the segment of interest, means 62 to approximate Am and Bm as binary power series, means 64 to reform AmUi+BmVi with the approximated values of Am and Bm, means 66 to compare the approximated expression AmUi+BmVi with a threshold value t, means 68 to indicate that an edge is present if the approximate value exceeds t, means 70 to indicate that no edge is present if the approximated value is $\leq t$, means 72 to check if the entire set of data points have been processed with the Sobel operator and means 74 to begin the computational cycle again if data points remain to be processed, thus generating a new Xsi and Ysi for another point on screen 52.

It should be noted that device 43 could reform the quantity AmUi+BmVi with the minimum error values of Am and Bm generated by means 60. The use of means 62 and 64 to form Am and Bm as binary power series and the formation of an approximate expression AmUi+BmVi is a further embodiment of the basic invention. Further, means 66 through 74 are just one example of how the expression AmUi+BmVi can be used in image processing. Another example would be to utilize this expression in edge enhancement.

Also, if the values of Am and Bm are determined beforehand and made available in memory 48, device 43 could function in one form without means 60, 62 and 64 and instead form AmUi+BmVi in means 58 with stored values of Am and Bm; or, in another form, without means 58 and 60 and instead approximate Am and Bm as binary power series and form AmUi+BmVi in means 64 with Am and Bm as power series.

In operation, device 43 uses sensor 44 to sense light from a field of view 76. A to D converter 46 converts analog sensor information from sensor 44 to digital form and generates an array of data as digital data points Xjk held in digital memory 48. If desired, the digital information in memory 48 could be reconverted to analog form by digital to analog converter 50 and displayed on a TV screen 52 which would be the same as screen 10 in FIG. 1.

Means 56 scans the data Xjk selecting three by three matrixes of data Xjk as described above in connection with FIG. 1. Then in accordance with equation 2, gradient component functions Xsi and Ysi are generated for each point i. Means 58 then forms the linear approximation of equation 6 and means 60 performs the operations in accordance with equations 7 through 12 to yield the values of Am and Bm to minimize the error due to the approximation of the Sobel magnitude by equation 6. If m$\geq$1, a set of Am and Bm values is generated, one set for each segment m as indicated by equation 15. If desired, Am and Bm can be approximated by means 62 (employing binary logic in an iterative process until a desired degree of accuracy for Am and Bm separately is obtained) as a binary power series, and means 64 will reform equation 6 using the series approximated coefficients Am and Bm. Means 66 is simply a comparator that includes a preselected threshold value t to be compared to the result of equation 6, and means 66 is operatively connected with means 68 and 70 to indicate an edge or no edge depending on the result of the threshold comparison. Means 72 counts the number of data points which have been processed and if all the data points have been processed the cycle is completed. If data points remain to be processed, the counter is decremented by one by means 74 and the process is repeated for a new data point until all data points Xjk have been processed.

In our example of device 43, the net result of the process will be to define an edge line in terms of the location of data points Xjk and the same is displayed on screen 52. Of course, display on a screen is only way in which edge data can be utilized. The edge data could just as well be passed on to further devices which could, for example, indicate whether the configuration of the edge indicates the presence of a particular object.

Figure 5:
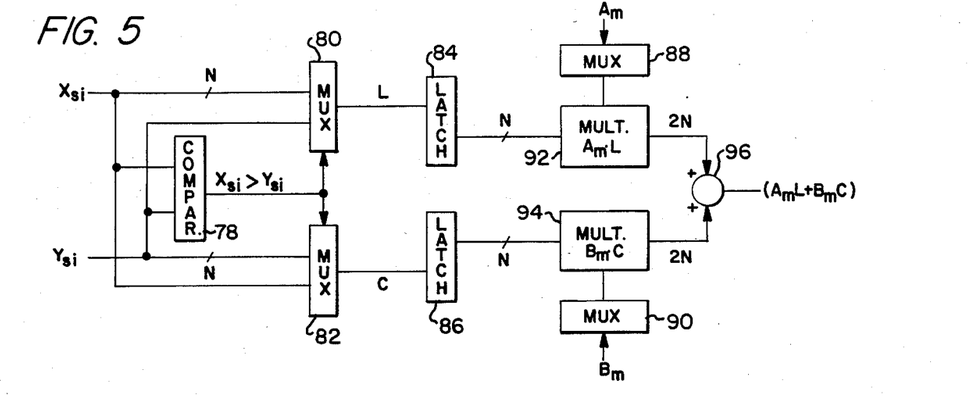
FIG. 5 is a schematic of a means for reforming the quantity $AmUi+BmVi$.

FIG. 5 is a more detailed schematic of means 64 of device 43. Therein, Xsi and Ysi are input to comparator 78. Multiplexer 80 is used to select the larger of Xsi and Ysi (indicated in FIG. 5 as L) and multiplexer 82 is utilized to select the smaller of the inputs (indicated as C in FIG. 5). Latches 84 and 86 are utilized to hold signals L and C, respectively, for one clock period while multiplexers 88 and 90 select the appropriate coefficients Am and Bm to be multiplied by L or C in multipliers 92 and 94, respectively. Adder 96 completes means 64. Note that Am and Bm in FIG. 5 have been generated in means 62 (in the example of device 43).

Figure 6:
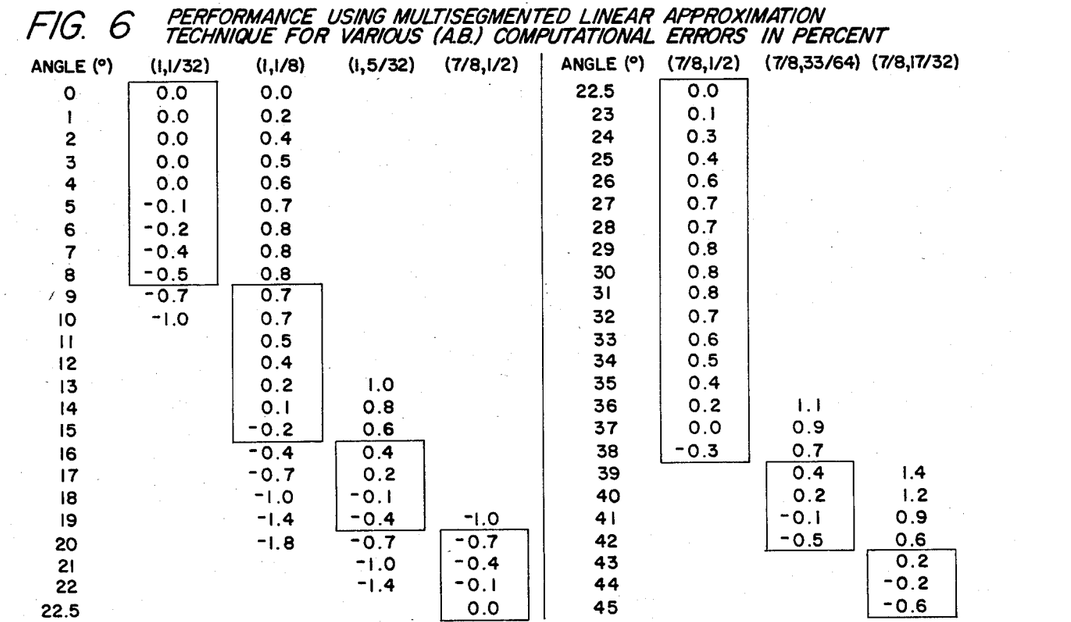
FIG. 6 is the table indicating the performance of the device and method of the present invention when a multisegmented approach is utilized.

One can simplify the computation of Am and Bm and also reduce the maximum error further by dividing the region of interest into several unequal segments. FIG. 6 displays the result of one choice of unequal segments where only two binary terms were used for A and four binary terms were used for B.

In FIG. 6 the first quadrant was divided into seven segments. The angular range of the segments is indicated by the limits of the boxes in each column. For example, the first segment is from 0° to 8°. The computation of equations 9 through 12 above yielded 1 as the value for A in this segment and 1/32 as the value for and B in this segment. The maximum error over this first segment is 0.5%. The maximum error in any segment in FIG. 6 is 0.8%. Further for each segment the error goes from a positive to a negative value indicating that at some point in each segment zero error is achieved. This indicates that increased accuracy in the approximation of the magnitude of S can be achieved by increasing the number of segments into which the coordinate space is divided. In fact the magnitude of S can be extended to arbitrary precision with minimum difficulty.

It should be noted that if the first quadrant is divided into four equal segments with A and B selected as indicated in table 1 immediately below, the maximum error is 1.3%.

TABLE I

| Segment Boundaries $\theta$ | Exact Coefficients A | B | Max % Error | Approximate Coefficients A | B | Max % Error |
| --- | --- | --- | --- | --- | --- | --- |
| $0-\pi/16$ | 1.0032 | 0.0354 | 0.9 | 1 | 1/32 | 1.3 |
| $\pi/16-\pi/8$ | 0.9478 | 0.3261 | 0.9 | 15/16 | 11/31 | 1.3 |
| $\pi/8-\frac{3\pi}{16}$ | 0.8570 | 0.5205 | 0.9 | 7/8 | 1/2 | 1.3 |
| $\frac{3\pi}{16}-\pi/4$ | 0.7692 | 0.6420 | 0.9 | 3/4 | 21/32 | 1.3 |

Figure 7:
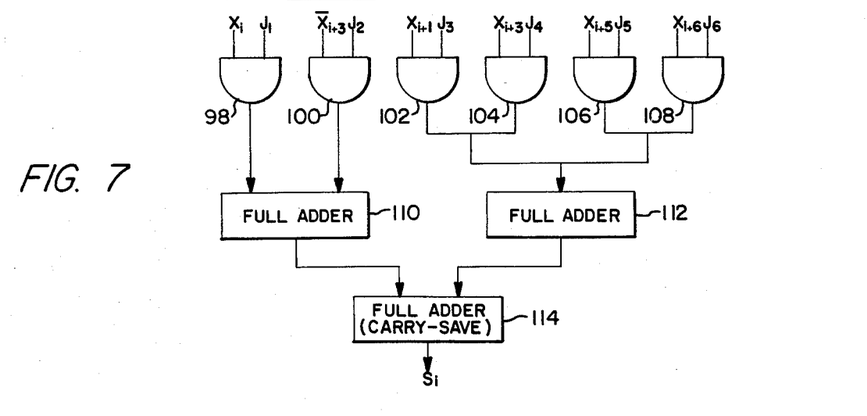
FIG. 7 is a schematic of a logic circuit for generating one value Si for a particular Am and Bm.

FIG. 7 is a schematic of a logic circuit which can be used to replace the two multipliers 92 and 94, adder 96 and the relatively complex coefficient selection logic of multiplexers 88 and 90 in FIG. 5. FIG. 7 is merely one example of logic that could be utilized to implement the segmented scheme of the present invention. In particular FIG. 7 is a logic circuit which could be utilized to generate the values of Am and Bm corresponding to the values of FIG. 6. Note that all values of Am in FIG. 6 can be generated by combining 1 and $-\frac{1}{8}$. Similarly Bm in FIG. 6 can be generated by forming combinations of $\frac{1}{2}, \frac{1}{8}$, 1/32 and 1/64. In FIG. 7 the numeric subscript for x indicates the power to which 2 is raised to form the denominator of the corresponding input. For example $Xi+3=\frac{1}{2}^3=\frac{1}{8}$. By generating the proper select signals J1–J6, various of the input AND gates (98 through 108) will either output a value equal to the Xi input of the gate or output zero. For example, to generate $Am=\frac{7}{8}$, J1 and J2 are set to a select value thus outputting Xi (i.e., 1) and Xi+3 (i.e., $-\frac{1}{8}$). These two outputs are added in adder 110 to yield $\frac{7}{8}$. If one wishes to generate a Bm equal to 17/32, J3 and J5 will indicate select and J4 and J6 will indicate no select thus the output of AND gate 102 will be $\frac{1}{2}$, the output of AND gate 104 will be zero, the output of AND gate 106 will be 1/32 and the output of AND gate 108 will be zero. This in turn will yield an output from adder 112 of $\frac{1}{2}+1/32$ or 17/32. Full adder 114 is used in conjunction with comparator 78, multiplexers 80 and 82 and latches 84 and 86 of FIG. 5 to form the Sobel magnitude Si for one point i in the data base Xjk yielding the output of FIG. 5.

By generating Am and Bm as a binary power series of a particular form as defined by equations 16 and 17, the formation of the products in equation 6 is computed by relatively simple multiplication by binary numbers. In particular Ui and Vi is multiplied by each of the elements in the power series of Am and Bm, respectively. Since the coefficients $c_i$ and $d_i$ in equations 16 and 17 are restricted to $+1, 0$ or $-1$, only a few simple bit shifting and adding operations are required to form the products in equation 6.

In order to generate the select signals J1 through J6 in FIG. 7, equation 5 is utilized to determine the angle $\theta$. $\theta$ is used to indicate which of the various segments m for which Si should be computed, and identification of the appropriate segment will in turn dictate which of the control signals J1 through J6 will be utilized. J1 through J6 can be generated with relatively simple binary logic once m is determined. The angular range of the segments m can be placed in memory 48 and $\theta$ compared to those ranges to determine m.

Figure 8:
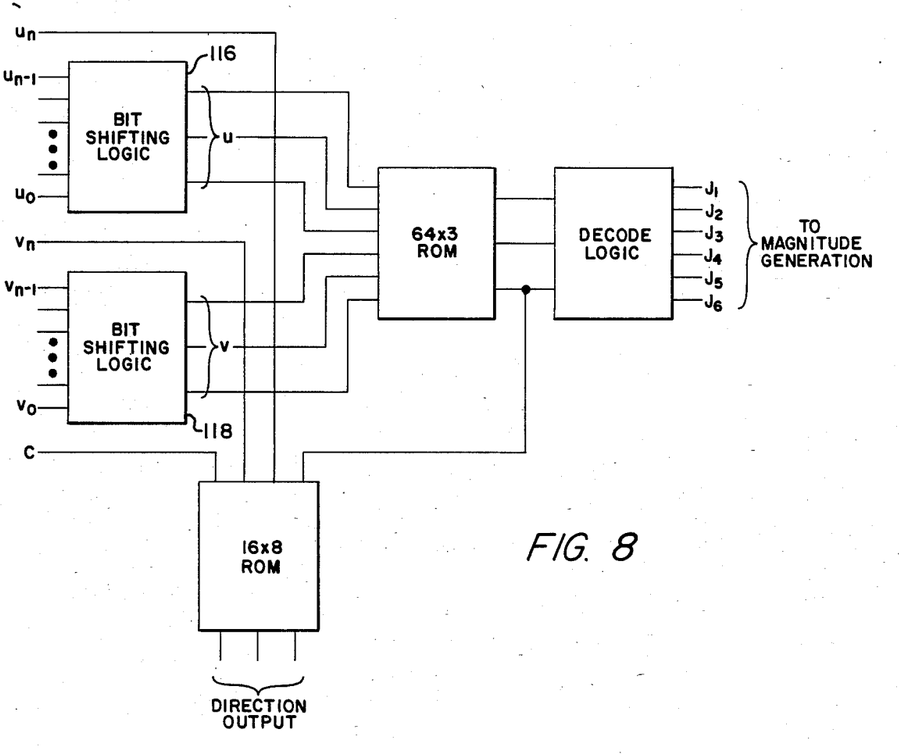
FIG. 8 is a schematic of an edge direction determination circuit.

One scheme for the generation of control signals J1 through J6 is shown in the schematic of FIG. 8. Since the proper quadrant is determined by the sign bits on Xs and Ys, the only important determination is whether or not the edge direction, when reflected to the first half of the first quadrant, is less than or greater than 22.5°. Only a single ROM output bit is required for that indication. Combined with the two sign bits and some simple logic, three edge direction bits are provided and can be used to indicate one of eight directions. One can, however, provide two extra ROM output bits to indicate more exact angle information. The three ROM bits are then used to feed simple decoding logic for the generation of the six Ji (see FIG. 8). C in FIG. 8 indicates that Xs and Ys have been switched because Ys$\frac{1}{2}$Xs. For n bits in U or V, the bit shifting logic 116 and 118 is used to insure that the bits being processed are not all zero.

A single gate array chip of less than 2000 gates can easily generate Xsi and Ysi, as well as the six Ji (as per FIG. 8) and provide the logic of FIG. 7 (as incorporated in FIG. 5).

From table 1 it is seen that the use of equal segments will yield a highly accurate result for Si. Nevertheless if unequal segments are to be utilized, an examination of FIG. 2 will yield some insight into advantageous choices of segment boundaries. The seven segments selected in FIG. 6 should be examined in conjunction with FIG. 2. The unequal segmentation is a result of choosing Am and Bm as the first few terms of a binary power series. When minimizing the error function in equation 9 and minimizing the number of segments, the problem's symmetry is destroyed, resulting in unequal segments.

In this connection, because the Sobel magnitude deviates from the edge gradient amplitude in a way which is dependent on $\theta$, computation of the best Am and Bm for approximation of the edge gradient amplitude would require the introduction of a weighting function $f(\theta)$ in the integral expression in equation 9. This is:

$$E^2(A,B) = \int_0^{\pi/4} \int_0^R f(\theta)[A\cos\theta + B\sin\theta - 1]r\,dr\,d\theta. \quad (18)$$

This allows the values of Am and Bm to be chosen to approximate the actual edge gradient amplitude rather than the Sobel magnitude.

For quadrants other than the first quadrant, the computations would be the same as above and the sign bits of Xs and Ys could be utilized to determine the quadrant.

The above discussion has employed the Sobel square root edge operator as the square root operator employed in the means and method of the present invention. It is clear however, that any operator of the form of equation 1 where Xsi and Ysi are edge gradient components, can be employed in the present invention to produce edge line approximations. For each operator, a different $f(\theta)$ would be used in equation 18.

In fact, the above techniques and devices could be utilized to process data other than optical image edge data whenever an equation of the form of equation 1 is a sufficient description of the system being modeled and Xs and Ys are components lying along orthogonal axes.

What is claimed is:

1. A method of processing edge data concerning an edge of an image where the edge gradient magnitude Si at a point i in space is approximated by an expression of the form $Si=(Xsi^2+Ysi^2)^{\frac{1}{2}}$, where Xsi and Ysi are the vertical and horizontal edge gradient components for point i lying along mutually orthogonal axes in said space, comprising:

sensing light from a scene, said scene including an object;
   generating electrical signals with said sensed light, said electrical signals representing the intensity of said sensed light with sensed light from said object providing said image;
   digitizing said electrical signals;
   generating Xsi and Ysi from said digitized electrical signals;
   forming the expression AmUi+BmVi where
   m is an index and an integer greater than or equal to 1.
   Am and Bm are constant coefficients to be determined, $$Ui = \begin{cases} |Xsi| & \text{if } |Xsi| \geq |Ysi| \\ |Ysi| & \text{if } |Xsi| < |Ysi| \end{cases} \text{ and}$$

$$Vi = \begin{cases} |Ysi| & \text{if } |Xsi| \geq |Ysi| \\ |Xsi| & \text{if } |Xsi| < |Ysi|; \end{cases}$$

determining the values of Am and Bm which minimize the error in the value of Si according to a selected error computation when Si is approximated by AmUi+BmVi;
   reforming AmUi+BmVi with said error minimizing values of Am and Bm; and
   determining whether or not the $i^{th}$ point is an edge point so that further processing of edge data can proceed.

2. The method of claim 1 further including:
   after said determining of the values of Am and Bm to minimize error, approximating Am and Bm as a binary power series with each of said series having a limited number of terms.

3. The method of claim 1 further including:
   after forming AmUi+BmVi, segmenting said space into m sectors, and generating Am and Bm for each of said m sectors to minimize error within each of said m sectors.

4. The method of claim 3 wherein:
   said segments are represented as polar coordinates and one of the boundaries between two of said segments is $\pi/8$.

5. The method of claim 1 further including: displaying said edge point in relation to said scene.

6. The method of claim 1 wherein said reforming forms the products AmUi and BmVi by bit shifting and adding operations.

7. An apparatus for processing edge data concerning an edge of an optical image where the edge gradient magnitude Si at a point i in space is approximated by an expression of the form $Si=(Xsi^2+Ysi^2)^{\frac{1}{2}}$, where Xsi and Ysi are the vertical and horizontal edge gradient components for point i lying along mutually orthogonal axes in said space, comprising:

means for sensing light from a scene, said scene including an object;
   means for generating electrical signals with said sensed light, said electrical signals representing the intensity of said sensed light with sensed light from said object providing said image;
   means for digitizing said electrical signals;
   means for generating Xsi and Ysi from said digitized electrical signals;
   means for forming the expression AmUi+BmVi where
   m is an index and an integer greater than or equal to 1
   Am and Bm are constant coefficients to be determined, $$Ui = \begin{cases} |Xsi| & \text{if } |Xsi| \geq |Ysi| \\ |Ysi| & \text{if } |Xsi| < |Ysi| \end{cases} \text{ and}$$

$$Vi = \begin{cases} |Ysi| & \text{if } |Xsi| \geq |Ysi| \\ |Xsi| & \text{if } |Xsi| < |Ysi|; \end{cases}$$

means for determining the values of Am and Bm which minimize the error in the value of Si according to a selected error computation when Si is approximated by AmUi+BmVi;
   means for reforming AmUi+BmVi with said values of Am and Bm which minimize error; and means for determining whether or not the $i^{th}$ point is an edge point so that further processing of said edge data can be performed.

8. The device of claim 7 further including:
   means for approximating Am and Bm as a binary power series wherein each of said series which includes a limited number of terms.

9. The device of claim 7 further including:
   means for segmenting said space into m sectors.

10. The apparatus of claim 7 further including:
    means for displaying said edge point in relation to said scene.

11. The apparatus of claim 7 wherein said means for reforming includes means for forming the products AmUi and BmVi by bit shifting and adding operations.

* * * * *

UNITED STATES PATENT AND TRADEMARK OFFICE
CERTIFICATE OF CORRECTION

PATENT NO. : 4,553,260
DATED : NOVEMBER 12, 1985
INVENTOR(S) : RONALD A. BELT, ET AL

It is certified that error appears in the above-identified patent and that said Letters Patent is hereby corrected as shown below:

In claim 1, column 9, lines 44 and 45, delete "and an integer greater than or equal to 1."

In claim 7, column 10, line 36, delete "and an integer greater than or equal to".

Signed and Sealed this

Eleventh Day of March 1986

[SEAL]

Attest:

DONALD J. QUIGG

Attesting Officer

Commissioner of Patents and Trademarks